(12) United States Patent
Trautenberg

(10) Patent No.: US 7,916,073 B2
(45) Date of Patent: Mar. 29, 2011

(54) METHOD AND APPARATUS FOR IMPROVING INTEGRITY COMMUNICATION IN A SATELLITE NAVIGATION SYSTEM

(75) Inventor: Hans L. Trautenberg, Ottobrunn (DE)

(73) Assignee: Astrium GmbH, Munich (DE)

( * ) Notice: Subject to any disclaimer, the term of this patent is extended or adjusted under 35 U.S.C. 154(b) by 196 days.

(21) Appl. No.: 12/256,281

(22) Filed: Oct. 22, 2008

(65) Prior Publication Data

US 2009/0135055 A1   May 28, 2009

(30) Foreign Application Priority Data

Oct. 22, 2007   (DE) .......................... 10 2007 050 716

(51) Int. Cl.
*G01S 19/08*   (2010.01)
(52) U.S. Cl. .................................................. 342/357.45
(58) Field of Classification Search ............. 342/357.02, 342/357.45
See application file for complete search history.

(56) References Cited

U.S. PATENT DOCUMENTS

| 5,808,581 | A | * | 9/1998 | Braisted et al. | .......... 342/357.02 |
| 7,019,687 | B1 | * | 3/2006 | Schempp et al. | ......... 342/357.02 |
| 2005/0015680 | A1 | * | 1/2005 | Rubin et al. | ..................... 714/47 |
| 2005/0246093 | A1 | * | 11/2005 | Olague et al. | ................. 701/207 |

FOREIGN PATENT DOCUMENTS

| DE | 10 2004 012 039 A1 | 10/2005 |
| EP | 1 637 899 A1 | 3/2006 |

OTHER PUBLICATIONS

European Search Report dated Apr. 7, 2009 with English translation (Six (6) pages).
S. Journo, et al., "Producing the Galileo Services From the Ground Mission Segment (GMS)" Proceedings of Ion GNSS 2006, Sep. 26, 2006, pp. 504-519, XP002521138.
H. Blomenhofer et al., "GNSS/Galileo Global and Regional Integrity Performance Analysis", Ion GNSS. International Technical Meeting of the Satellite Division of the Institute of Navigation, Washington, DC, US, Sep. 21, 2004, pp. 2158-2168, XP002415356.
V. Oehler et al., "The Galileo Integrity Concept", Ion GNSS. International Technical Meeting of the Satellite Division of the Institute ofNavigation, Washington, DC, US Sep. 21, 2004, pp. 604-615, XP002375520.
C. Hernandez et al., "Galileo Integrity: The Ground Segment Computation Algorithm Perspective", Proceedings of Ion GNSS 2006, Sep. 26, 2006, pp. 2634-2645, XP002521139.

\* cited by examiner

*Primary Examiner* — Thomas H Tarcza
*Assistant Examiner* — Harry Liu
(74) *Attorney, Agent, or Firm* — Crowell & Moring LLP

(57) ABSTRACT

In a method of improving the integrity communication in a satellite navigation system which comprises a space segment having multiple satellites which emit navigation signals for the reception and evaluation by use systems for position determination, and a ground segment having several observation stations which monitor the satellites, an error budget for different observation stations or groups of observations stations is transmitted with the navigation signal of a satellite. The navigation signal is received and an error budget contained therein is evaluated by computing a scalar value from the error budget. The scalar value indicates the precision of the error estimate for the generation of the navigation signal.

17 Claims, 2 Drawing Sheets

METHOD AND APPARATUS FOR IMPROVING INTEGRITY COMMUNICATION IN A SATELLITE NAVIGATION SYSTEM

CROSS-REFERENCE TO RELATED APPLICATIONS

This application is related to U.S. application Ser. No. 12/252,944, filed Oct. 16, 2008.

BACKGROUND AND SUMMARY OF THE INVENTION

This application claims the priority of German patent document 102007050716.1-35, filed Oct. 22, 2007, the disclosure of which is expressly incorporated by reference herein.

The invention relates to a method and apparatus for improving integrity communication in a satellite navigation system.

Global Navigation Satellite Systems (GNSS) (sometimes referred to herein as "satellite navigation systems") are used for position determination and navigation on the ground, on water and in the air. GNSS Systems, such as, for example, the European Navigation Satellite System currently being constructed (also referred to herein as the Galileo System, or simply "Galileo") include i) a satellite system (space segment) comprising a plurality of satellites, ii) an earth-fixed receiving device system (ground segment), which comprises several ground stations as well as Galileo sensor stations and is connected with a central computing station, and iii) utilization systems (users), which evaluate and use the satellite signals transmitted by radio from the satellites, particularly for navigation. The arrangement and the method can also be used for regional satellite navigation expansion systems or regional satellite navigation systems as well as for regional navigation systems.

In a GNSS, precise detection of a user's position requires local as well as global integrity. Integrity means especially that, on the one hand, the GNSS is capable of warning a user within a certain time period when parts of the GNSS should not be used for navigation, for example, in the event of a failure of system components, and that, on the other hand, the user can trust the navigation data which he receives by way of satellite navigation signals from the satellites of the GNSS, particularly that he can rely on the precision of the received navigation data.

In the integrity concept of Galileo, it is planned to monitor each satellite from the earth-fixed receiving device system and to transmit corresponding message signals with respect to the behavior of each satellite to use systems; for example, an estimated signal-in-space accuracy (SISA) of a satellite or a simple error indication "Not OK" in the event of a faulty satellite; or the precision with which errors on the navigation signals can be determined by the observation system.

Galileo should also be capable of monitoring the signal-in-space (SIS) within the ground segment by using the measurements from the individual Galileo sensor stations. Based on the known positions of the Galileo sensor stations, the current position of a satellite and thereby the maximal error of the satellite or of the signal in space emitted by it (the so-called signal-in-space error, SISE) can be estimated.

A prediction of the distribution of the SISE can be represented by a normal statistical distribution with the smallest standard deviation. This prediction is called signal-in-space accuracy (SISA). By means of the SISA, the difference can be described between the current 4-dimensional position (orbit and clock time) of a satellite and the predicted 4-dimensional position that is contained in a navigation message.

However, the estimation of the SISE is itself an error-laden process. As a rule, it is therefore assumed that the distribution of the current SISE around the value of the estimated SISE can be described by a normal statistical distribution with the standard deviation, which is called the signal-in-space monitoring accuracy (SISMA). The SISMA therefore is the precision of the estimation of the SISE for a satellite.

In the case of the previous concept of Galileo for the transmission of the SISMA, for each satellite a scalar SISMA value is transmitted that is conservative for every conceivable position of a use system (user position). However, as a result, much of the efficiency of the GNSS is given away because a clearly excessive SISMA value is transmitted in many positions, which results in a high-expenditure integrity communication in the GNSS, and much of the efficiency of the observation system is not made accessible to the user.

Since the individual observation stations have a relatively high failure probability, it will, in addition, again be necessary to take into account possible failures of ground stations in advance when calculating the scalar value. Thus, a sufficiently large number of failures must be considered such that even the strictest continuity demands can be met. However, for use systems that do not make such high demands on the continuity, this consideration will again result in a clearly excessive scalar value. In addition, for computing the scalar value for each satellite, the least demanding observation station is not used, which is clearly more conservative than is frequently necessary.

It is therefore an object of the present invention to provide a method and apparatus for improving integrity communication in a satellite navigation system.

This and other objects and advantages are achieved by the method and apparatus according to the invention, in which, for the different observation stations of a satellite navigation system (or for groups of observation stations of a satellite navigation system), error budgets are transmitted to use systems, rather than the scalar SISMA value referred to previously. In particular, such error budgets can be transmitted as ranges of possible values for the average of several error budgets, where the average is taken over the individual error budgets.

The error budget p(x), as provided herein, is described by defining two functions qr(x) and ql(x), to which the following expressions apply:

$$\int_{-\infty}^{L} p(x)dx \le \int_{-\infty}^{L} ql(x)dx, \text{ and}$$
$$1 - \int_{-L}^{L} p(x)dx \ge 1° - \int_{L}^{\infty} qr(x)dx,$$

for all values of L. That is, the above relationships must be satisfied for all values of the variable L. A description of ql and qr is also transmitted. The functions ql and qr are multiples of normal statistical distributions, which may have different standard deviations and average values.

Based on this information, and based on the positions of the observation stations (also transmitted to the use systems) and the information concerning the momentarily used observation stations, particularly of individual use systems (also transmitted to the use systems), an estimate of the distribution can be calculated which indicates the precision of the error estimate regarding generation of the navigation signal. As a result, the estimates for the distribution of the precision of the error estimate for the generation of the navigation signal (which some use system are using) can be more precise (narrower, lower) because the estimate for the distribution of the precision of the error estimate for the generation of the navigation signal can be computed by a use system, as a function of its location.

Thus, an estimate for the distribution of the precision of the error estimate for the generation of navigation signal no longer needs to be calculated such that it is valid for all use systems in a center of the satellite navigation system, and transmitted to the use systems. Rather, because the computation of the estimate for the distribution of the precision of the error estimate for the generation of the navigation signal is performed in each use system based on its location, continuity demands of individual use systems can also be taken into account, so that the highest demands on the continuity need no longer be met at each use system. On the whole, as a result of the invention, the integrity communication in a satellite navigation system can be improved significantly because clearly more precise estimates for the distribution of the precision of the error estimation of the generating of the navigation signal can be used in the use system.

The estimate for the distribution of the precision of the error estimate for generation of the navigation signal may also be a scalar value.

According to an embodiment of the invention, a method is provided for improving integrity communication in a satellite navigation system which comprises i) a space segment having several satellites that emit navigation signals for the reception and evaluation by use systems for position determination, and ii) a ground segment that includes several observation stations, which monitor the satellites. The method according to the invention comprises the following:

transmitting, with a navigation signal of a satellite, an error budget for different observation stations or groups of observation stations;

transmitting the positions of the observation stations;

transmitting information regarding which observation stations are supplying observations;

transmitting the elevation angle at which observation stations supply observations;

transmitting information regarding which ground stations are supplying no observations;

transmitting information regarding which observations from specific ground stations to specific satellites are not available, although they should be available according to the preceding rules; and reception of the navigation signal and evaluation of the error budget contained therein.

Based on the error budget and the coordinates of the observation stations used, the observation system computes a signal-specific, user-system-dependent and user-system-position-dependent estimate for the distribution of the precision of the error estimate for generation of the navigation signal, which indicates the precision of the error estimate for generation of the navigation signal by the observation system.

In this case, generation of the navigation signal relates particularly to the orbit of the satellite emitting the signal, the transmission time of the signal and the signal structure. As a result of this method, a use system can receive significantly smaller values than the initially explained conservative (and therefore relatively large) values. On the whole, integrity communication in the satellite navigation system to individual user systems is therefore improved. The transmission can generally take place at a relative low repetition rate in order to minimize the data traffic in the satellite navigation system attributable to integrity communication.

According to an embodiment of the invention, the error budget can be transmitted as a statistical value.

Furthermore, according to an embodiment of the invention, the error budget may also be transmitted as intervals for the average values of several error budgets.

According to an embodiment of the invention, the error budget may also be a function of elevation. This permits a still more precise computation of a scalar value, and thus improves the precision of the error estimate.

Furthermore, according to an embodiment of the invention, coordinates of the observation stations that are used to determine the error budgets and the shading angles associated therewith, can be transmitted, and can be used to compute of the distribution of the precision of the error estimate for generation of the navigation signal. Here also, the transmission can take place at a relatively low rate of repetition.

In addition, according to an embodiment of the invention, the expected continuity of the availability of measurements of each observation station used for the determination of the error budget (or of each group of observation stations) can be transmitted and used for the computation of the scalar value. This technique proves advantageous mainly when computing the distribution of the precision of the error estimate for generation of the navigation signal, and its reliability.

In a further embodiment of the invention, a first alarm message can be transmitted with the navigation signal when an observation station has failed. A use system can thereby be warned, and such warning can be taken into account when computing the distribution of the precision of the error estimate for generation of the navigation signal on the basis of the received error budget.

Furthermore, according to an embodiment of the invention, if a measurement of a satellite signal by an observation station is lost, the number of the observation station and of the concerned satellite are transmitted with the satellite navigation signal, so that a use system can detect which observation stations should not be used for computation of the distribution of the precision of the error estimate for the generation of the navigation signal of a specific (satellite) signal.

In addition, according to an embodiment of the invention, a second alarm message can be transmitted with the navigation signal when the error budget is to be changed. Use systems can thereby be informed that a new computation of the distribution of the precision of the error estimate for the generation of the navigation signal may be necessary on the basis of the changed error budget.

In a further embodiment, the invention provides a use system for a satellite navigation system, particularly a mobile navigation device, which is constructed to be used with a method according to the invention and is constructed as described above.

In particular, according to an embodiment of the invention, the use system may also be constructed for computing the distributions of the precision of the error estimate for generation of the navigation signal based on received error budget, and for determining an integrity risk therefrom.

Furthermore, according to an embodiment of the invention, the use system may also be configured to compute the distribution of the precision of the error estimate for the generation of the navigation signal such that a predetermined continuity can be reached. Corresponding to its continuity demands, a use system can thereby compute a correspondingly optimized distribution of the precision of the error estimate for generation of the navigation signal. The optimization takes place in that, even in advance, observation stations are taken into account as potentially not available. This optimization can be carried out in the user system in a manner adapted to the individual user demands.

Finally, according to an embodiment of the invention, an arrangement is provided for improving integrity communication in a satellite navigation system, wherein the satellite navigation system comprises i) a space segment with a plurality of satellites which emit navigation signals for the reception and evaluation by use systems for the position determination, and ii) a ground segment with several observation stations which monitor the satellites. The arrangement comprises:

error budget determination devices for determining an error budget for different observation stations (or groups of observation stations); and transmission devices for transmitting the error budget to at least one satellite for emission with a navigation signal of a satellite.

Such an arrangement can be situated, for example, in the ground segment and can influence integrity communication in the satellite navigation system, by means of the error budget or budgets.

The terms used in the attached list of reference symbols and the assigned reference numbers are used in the description, in the claims, in the abstract and in the drawings.

Other objects, advantages and novel features of the present invention will become apparent from the following detailed description of the invention when considered in conjunction with the accompanying drawings.

DETAILED DESCRIPTION OF THE DRAWINGS

In the following, identical element and/or functionally identical elements are provided with the same reference numbers.

Figure 1:
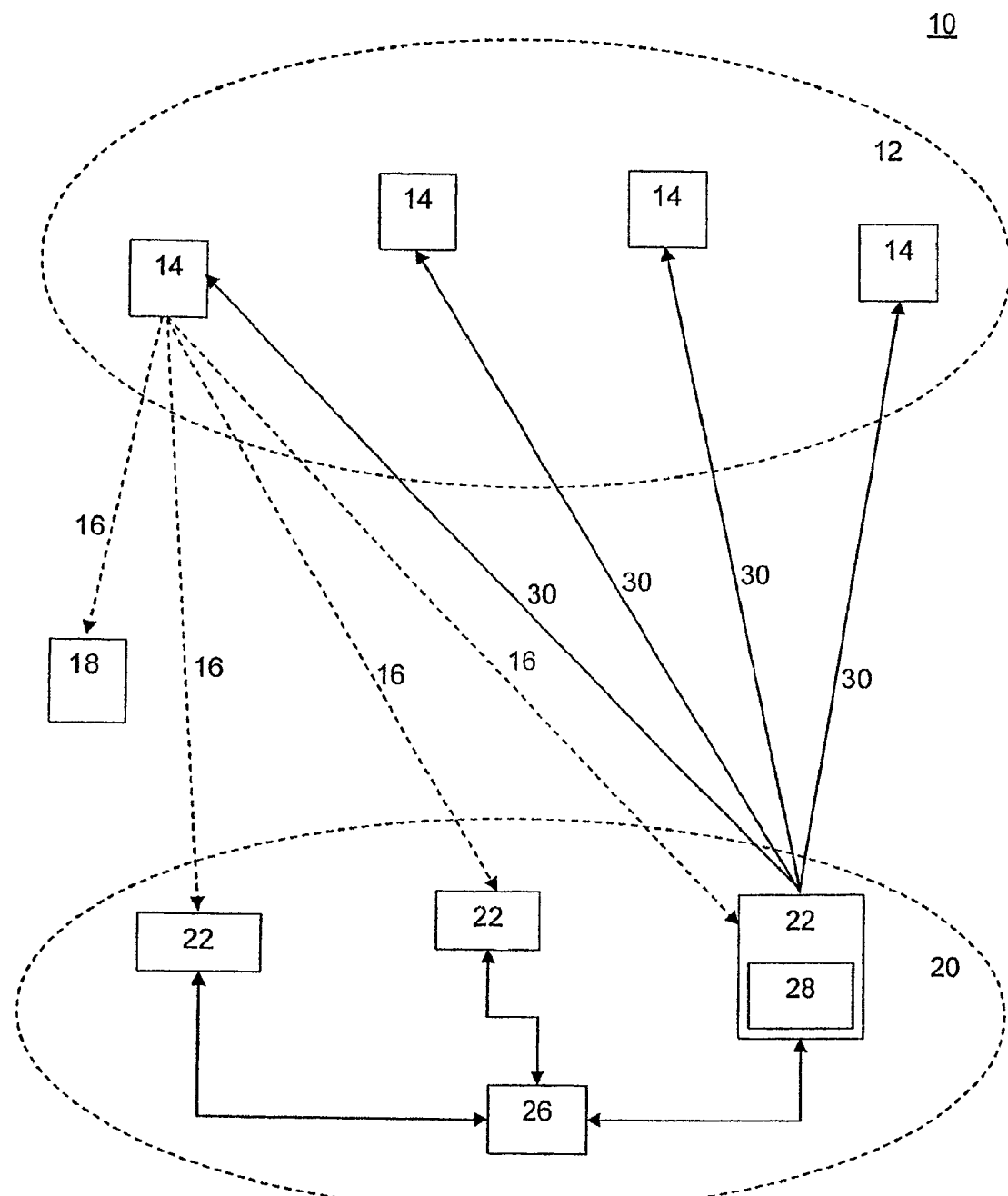
FIG. 1 is a view of a satellite navigation system with an embodiment of an arrangement for improving integrity communication in a satellite navigation system according to the invention.

FIG. 1 illustrates a satellite navigation system 10 having a space segment 12 and a ground segment 20. The space segment 12 comprises several satellites 14 which orbit the ground segment 20 on their respective orbit. Each satellite emits navigation signals 16 which can be received by use systems 18, such as mobile navigation devices, and by observation stations 22 of the ground segment 20. The observation stations 22 are provided particularly for monitoring the satellites 14, and coordination of, for example, the integrity communication in the satellite navigation system 10.

For this purpose, the observation stations evaluate the received navigation signals 16, and examine the data of a satellite 14 transmitted with each navigation signal 16, particularly the orbit and point in time of the generating of the signal as well as the signal structure. An observation station 22 can also send control messages 30 to satellites, for example, to correct satellite data, or to influence the integrity communication in the satellite navigation system 10, which will be described in greater detail in the following.

To improve integrity communication in the satellite navigation system 10, according to the invention, an error budget for different observation stations or groups of observation stations is transmitted to use systems 18, together with the navigation signals 16 of the satellites 14. Each use system 18 that receives a satellite navigation signal 16 with the error budget can evaluate the error budget, and computes a scalar value therefrom, which indicates the precision of the error estimate for generation of the satellite navigation signal, with which the error budget was transmitted; thus it indicates the SISMA.

The present invention differs from the prior art, in which a scalar value transmitted with the navigation signal 16 directly from a satellite 14 and, as initially explained, is relatively rigid (and therefore very conservative) since all conceivable satellite errors in the system must be taken into account, and no individual adaptation to, for example, the position and the demand of a user system is possible.

In contrast to the prior art, according to the invention, one or more error budgets are transmitted for different observation stations or groups of observation stations, from which each use system 18 can compute its own individual scalar value corresponding to its demands. Such scalar value is used to classify the integrity risk of satellite navigation signals. As a result, the integrity communication is significantly improved because it can be adapted more individually to specific use systems and their demands.

The error budget for different observation stations or groups of observation stations can be determined by error budget determination devices 26 in the ground segment 20. For this purpose, data can be transmitted from the individual observation stations 22 to the error budget determination devices 26 for evaluation of error budgets. An error budget determined by the error budget determination devices 26 can then be introduced in the integrity communication in the satellite navigation system 10. For this purpose, the determined error budget is transmitted to transmission devices 28 of the error budget determination devices 26 for the emission to satellites 14. The transmission devices 28 may be arranged in an observation station 22 for the purpose of transmitting the error budget (received from the error budget determination devices 26), for example by means of control messages 30 to the individual satellites 14. The latter, in turn, can transmit the received error budget with their satellite navigation signals 16 to use systems 18.

Figure 2:
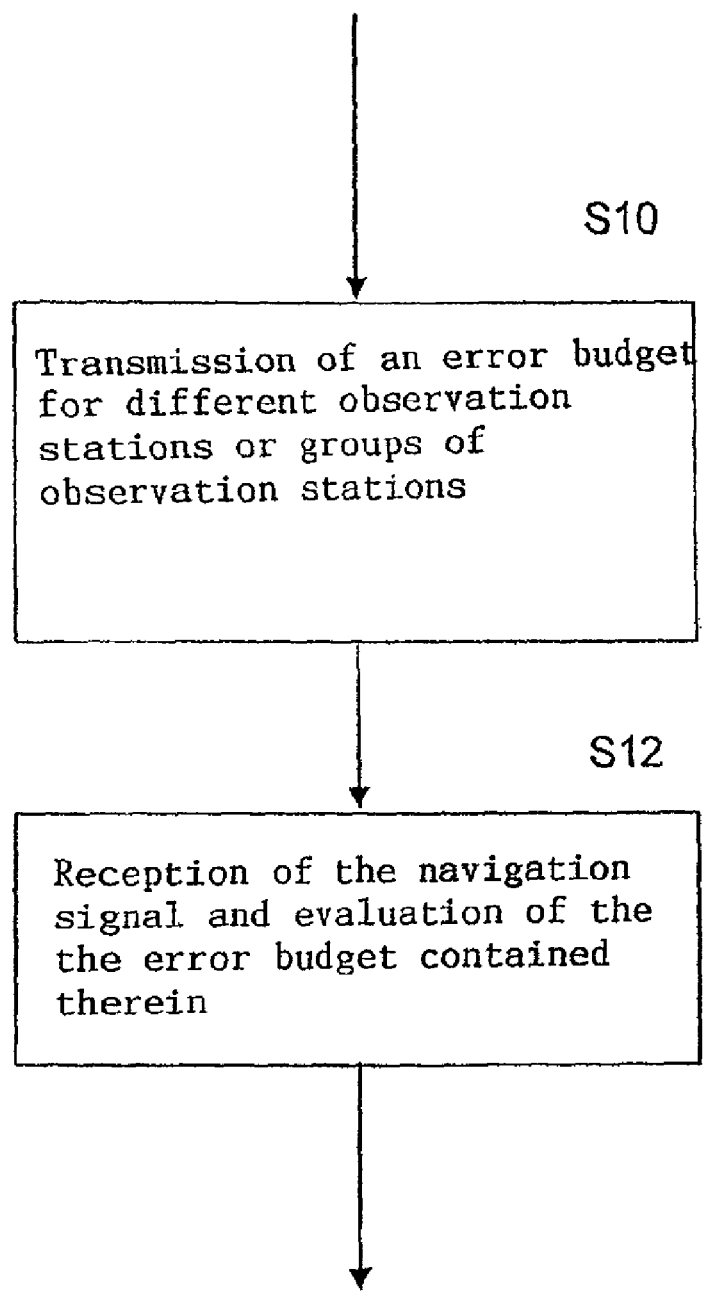
FIG. 2 is a flow chart of an embodiment of a method for improving integrity communication in a satellite navigation system according to the invention.

FIG. 2 shows the sequence of a method for improving integrity communications in the satellite navigation system 10 according to the invention. In a first Step S10, an error budget for different observation stations or groups of observation stations is transmitted; that is, it is sent out with a satellite navigation signal. In a second Step S12, the navigation signal of the satellite is then received, and the error budget contained therein is evaluated and used to compute a scalar value based on individual demands in a use system. As a result, a use system can obtain an individually computed scalar value which indicates the integrity risk in an optimized manner for this use system. On the whole, an improved integrity communication is achieved in the satellite navigation system.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

REFERENCE SYMBOLS

10 Satellite navigation system
12 space segment
14 satellites
16 navigation signals
18 use systems
20 ground segment
22 observation stations
24 arrangement for improving the integrity communication in a satellite navigation system
26 error budget determination device
28 transmission device
30 control message of an observation station 22

What is claimed is:

1. A method for improving integrity communication in a satellite navigation system, which comprises a space segment having a plurality of satellites that emit navigation signals for reception and evaluation by use systems for position determination, and a ground segment having a plurality of observation stations which monitor signals of the satellites, said method comprising:
   with a navigation signal generated by the satellite navigation system, transmitting an error budget for different observation stations or groups of observations stations;
   at least one of said use systems receiving the navigation signal and evaluating the error budget contained therein; and
   said at least one of said use systems computing a distribution of the precision of an error estimate for the generating of the navigation signal, based on the error budget, as well as its own position.

2. The method according to claim 1, wherein the error budget is transmitted as a statistical value.

3. The method according to claim 2, wherein the error budget is additionally transmitted as intervals for the average values of several error budgets.

4. The method according to claim 1, wherein the error budget p(x) is described in that two functions qr(x) and ql(x) are defined, to which $$\int_{-\infty}^{L} p(x)dx \le \int_{-\infty}^{L} ql(x)dx, \text{ and}$$

$$1 - \int_{L}^{\infty} p(x)dx \ge 1 - \int_{L}^{\infty} qr(x)dx,$$

applies for all values of L, and a description of the functions ql(x) and qr(x) is transmitted.

5. The method according to claim 4, wherein the functions ql and qr are multiples of normal statistical distributions, which may have different standard deviations and average values.

6. The method according to claim 1, wherein the error budget is also a function of the elevation.

7. The method according to claim 1, wherein coordinates of the observation stations used to determine of the error budget and shading angles connected therewith are transmitted and are used to compute the distribution of the precision of the error estimate of the generating of the navigation signal.

8. The method according to claim 1, wherein, in addition, an expected continuity of the availability of measurements of each observation station used for the determination of the error budget or of each group of observation stations is transmitted, and is used to compute the scalar value.

9. The method according to claim 1, wherein a first alarm message is transmitted with the navigation signal when an observation station has failed.

10. The method according to claim 1, wherein in the event of a loss of a measurement of a satellite signal by an observation station, a number of the observation station and of the concerned satellite is transmitted with the satellite navigation signal.

11. The method according to claim 1, wherein a second alarm message is transmitted with the navigation signal when the error budget is to be changed.

12. Integrity check apparatus for a satellite navigation system having a space segment that includes a plurality of satellites that transmit navigation signals for reception and evaluation by use systems for position determination, and a ground segment that includes a plurality of observation stations which monitor signals of the satellites, wherein:
   together with said navigation signal, at least one of said satellites transmits an error budget for different observation stations or groups of observation stations; and
   at least one of said use systems is configured to receive said transmitted error budget and to compute a distribution of an error estimate for generation of the navigation signal based at least on said error budget.

13. The integrity check apparatus according to claim 12, wherein said at least one of said use systems is further configured to determine an integrity risk based on said distribution.

14. The integrity check apparatus according to claim 12, wherein said use system is further configured to compute the distribution of the precision of the error estimate for generating the navigation signal such that a predetermined continuity can be reached.

15. An apparatus for improving the integrity communication in a satellite navigation system that includes a space segment having a plurality of satellites which emit navigation signals for reception and evaluation by use systems for position determination, and a ground segment having a plurality of observation stations which monitor the satellites, the arrangement comprising:
   error budget determination devices for determining an error budget for different observation stations or groups of observation stations; and
   transmission devices for transmission of the error budget and positions of the different observation stations or groups of observation stations to at least one satellite for the emission with a navigation signal of a satellite.

16. A method for improving integrity communication in a satellite navigation system which comprises a space segment having a plurality of satellites that emit navigation signals for reception and evaluation by use systems for position determination, and a ground segment having a plurality of observation stations which monitor signals of the satellites, said method comprising:
   at least one of said satellites transmitting to at least one of said use systems, together with a satellite navigation signal, an error budget for different observation stations or groups of observation stations of said satellite navigation system;
   based on said error budget, said at least one particular use system calculating an estimate, which is valid for that particular use system, of a distribution of the precision of the error estimate for the generation of the satellite navigation signal.

17. The method according to claim 16, wherein said error budgets are defined such that, for two functions qr(x) and ql(x), the following expressions are valid for all values of L:

$$\int_{-\infty}^{L} p(x)dx \le \int_{-\infty}^{L} ql(x)dx, \text{ and}$$

$$1 - \int_{L}^{\infty} p(x)dx \ge 1 - \int_{L}^{\infty} qr(x)dx,$$

applies for all values of L, and a description of the functions ql(x) and qr(x) is transmitted.

* * * * *